United States Patent [19]

Nichols

[11] Patent Number: 5,445,430
[45] Date of Patent: Aug. 29, 1995

[54] COLLAPSING ARM REST CONSTRUCTION

[75] Inventor: Lawrence R. Nichols, Dover, N.H.

[73] Assignee: Davidson Textron Inc., Dover, N.H.

[21] Appl. No.: 148,570

[22] Filed: Nov. 8, 1993

[51] Int. Cl.⁶ ............................................. B60N 2/46
[52] U.S. Cl. .................................. 296/153; 280/751; 297/411.21
[58] Field of Search ................. 296/153; 297/411.21, 297/411.45; 280/739, 751, 752

[56] References Cited

U.S. PATENT DOCUMENTS

| | | | |
|---|---|---|---|
| 3,362,749 | 1/1968 | Clement | 297/411.21 |
| 3,387,881 | 6/1968 | Stepanek et al. | 296/153 |
| 3,400,979 | 9/1968 | James | |
| 3,620,566 | 11/1971 | Leconte | 296/153 |
| 4,273,359 | 6/1981 | Scholz et al. | 280/751 |
| 4,783,114 | 11/1988 | Welch | 296/153 |
| 5,098,124 | 3/1992 | Breed et al. | 280/751 |
| 5,154,445 | 10/1992 | Weller | 280/751 |
| 5,181,759 | 1/1993 | Doolittle | 296/153 |
| 5,290,087 | 3/1994 | Spykerman | 296/153 |

FOREIGN PATENT DOCUMENTS

| | | | |
|---|---|---|---|
| 2104388 | 8/1972 | Germany | 280/751 |
| 4211964 | 10/1993 | Germany | 280/748 |
| 2220612 | 1/1990 | United Kingdom | 280/751 |

OTHER PUBLICATIONS

Automotive Technologies International, Inc., Dynapad (TM) Air Damped Padding, Product Brochure and Automotive News Article, 9 pages, Feb. 19, 1991.

*Primary Examiner*—Dennis H. Pedder
*Attorney, Agent, or Firm*—Reising, Ethington, Barnard, Perry & Milton

[57] ABSTRACT

A collapsible arm rest for a passenger compartment of a motor vehicle comprises a flexible skin or covering, a layer of foam material underlying the flexible skin to provide a cushion and soft feel for the collapsible arm rest, a back plate for securing the collapsible arm rest to a generally vertical panel of a motor vehicle, and an insert embedded in the foam layer for strengthening the arm rest. The insert comprises a hollow bellows shaped thin walled shell that is attached to the back plate so that the shell collapses in the lateral direction when the arm rest is subjected to a side load of the type experienced in a side impact automobile collision. The shell defines an empty chamber that communicates with ambient air in the exterior environment of the arm rest via a small open vent and a large vent that is covered by a rupturable membrane that ruptures when the shell collapses in the lateral direction to avoid pneumatic delay in the lateral collapse of the shell.

11 Claims, 2 Drawing Sheets

COLLAPSING ARM REST CONSTRUCTION

BACKGROUND OF THE INVENTION

This invention relates to arm rests and more particularly to arm rests associated with generally vertical panels in an automobile, such as automotive door panels.

Current arm rests for vertical automotive panels are generally rigid structures that include a semi-rigid urethane foam pad or cushion for softness. The semi-rigid urethane foam pad is typically an intermediate layer in a construction that includes a flexible outer skin and a rigid substrate or insert. The arm rest can be a separate structure that is attached to the automotive panel or it can be integrated into the automotive panel itself.

The primary function of an arm rest is provide a shelf that supports the forearm of a seat occupant comfortably. In order to function properly, the arm rest necessarily protrudes laterally from the vertical panel that it is associated with. Consequently the arm rest has been recognized as a potential source of injury to the seat occupant in a side impact collision for a long time. The prior art constructions discussed above have a common drawback with respect to side impact collisions in that there is very little absorption of the side loads by the semi-rigid foam cushion before the seat occupant encounters the rigid substrate.

A proposed solution to this side impact problem is to provide an arm rest that collapses in response to side loads. Of course these laterally collapsible arm rests must have sufficient vertical strength for use in supporting the arm loads that can be generated by the seat occupant. Moreover the laterally collapsible arm rests ordinarily must also retain sufficient lateral strength for use in opening and closing an automobile door because arm rests are associated with automotive door panels most of the time. Proposals for laterally collapsible arm rests are already known from the following patents.

U.S. Pat. No. 3,400,979 issued to Ivor F. James Sep. 10, 1968 discloses a safety arm rest in which a honeycomb filler of metal, paper or plastic is secured to a metal back up plate. This sub-assembly is inserted into a vinyl skin which is then filled with polyurethane foam filler material. The honeycomb filler has two rows of thin walled cells that are vertically elongated. These cells are filled with the polyurethane foam filler material either before or after the subassembly in inserted into the vinyl skin. The patent specification states that it is desirable to place a thin sheet of paper or fiberboard across the top of the honeycomb cells prior to insertion of the assembly. According to the patent specification, the arm rest is collapsible laterally but not vertically because of the orientation of the honeycomb cells and the sheet metal is easily distortable so that it is not a source of injury.

This arm rest is complicated as well as difficult and expensive to manufacture. Moreover, the thin sheet of paper or fiberboard across the top of the honeycomb cells appears necessary to avoid vertical collapse. This sheet adds manufacturing expense and contributes to the manufacturing difficulty by complicating the foaming operation.

U.S. Pat. No. 3,387,881 issued to George R. Stepanek and William H. Terrell Jun. 11, 1968 discloses a collapsible arm rest having a foldable or collapsible insert that is formed from a single sheet of polypropylene with living hinges, folded into a triangular shape and attached to an attaching plate. The insert is disposed in a decorative vinyl skin where it is yieldingly held in the full-line position shown in FIGS. 2 and 3 of the patent by foam which surrounds and fills the interior of the insert. According to the patent specification, the insert supports vertical loads of 100 psi applied to the top of the arm rest due to the generally triangular form of the insert. Also according to the patent specification, the insert folds up or collapses in the lateral direction when side loads of 15 psi are applied to the side of the arm rest due to the location of the hinges.

This arm rest also is difficult to manufacture because the insert must be folded precisely and maintained in this folded shape during the foaming process which surrounds and fills the interior of the insert with foam. Moreover, the generally triangular shape of the insert that is necessary to resist vertical loads also limits the amount of lateral collapse that is possible considerably primarily because of the unyielding nature of the inclined under panel that forms part of the insert.

U.S. Pat. No. 3,620,566 issued to Jacky Leconte Nov. 16, 1971 discloses an arm rest comprising a flexible body of cellar plastic material fitted to a sheet metal pressing that is secured to a longitudinal base plate. The sheet metal pressing comprises two lateral substantially V-shaped bent portions which are distorted in the case of shock. The bent portions have bent lugs that support a cardboard sheet and a semi-rigid foam or cellular padding element covered with the flexible body. A pair of tie members connect the front of the pressing to the base plate to prevent distortion when the arm rest is pulled by a user.

This arm rest is also complicated as well as difficult and expensive to manufacture. Moreover, the cardboard sheet supported on the sheet metal pressing which appears necessary to avoid vertical collapse adds manufacturing expense, contributes to the manufacturing difficulty by complicating the foaming operation and hinders lateral collapse of the arm rest. Furthermore the tie members that are necessary to prevent distortion when the arm rest is pulled hinder the collapse of the sheet metal pressing.

SUMMARY OF THE INVENTION

The object of this invention is to provide a collapsible arm rest that is simple in design and easy and economical to manufacture.

A feature of the invention is that the collapsible arm rest has a laterally collapsible insert or substrate that is closed so that the foam cushion is easily molded in place.

Another feature of the invention is that the collapsible arm rest has a laterally collapsible substrate in the form of an empty shell so that the collapsible arm rest is light weight.

Another feature of the invention is that the collapsible arm rest has a hollow, air filled insert that is protectively vented so that the arm rest remains debris free yet collapses in the lateral direction rapidly.

Another feature of the invention is that the collapsible arm rest has a blow moldable insert so that the arm rest can be manufactured easily and economically.

Still yet another feature of the invention is that the collapsible arm rest has an insert in the form of a hollow bellows that has several corrugations so that the arm rest collapses a substantial amount in the lateral direction, i.e. from about 3.5 inches to about 1 inch for an arm rest that protrudes about 3.5 inches.

Still yet another feature of the invention is that the collapsible arm rest has an insert in the form of a hollow bellows that has several corrugations so that the arm rest collapses a substantial amount in the lateral direction without any need for penetrating into the panel on which it is mounted.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
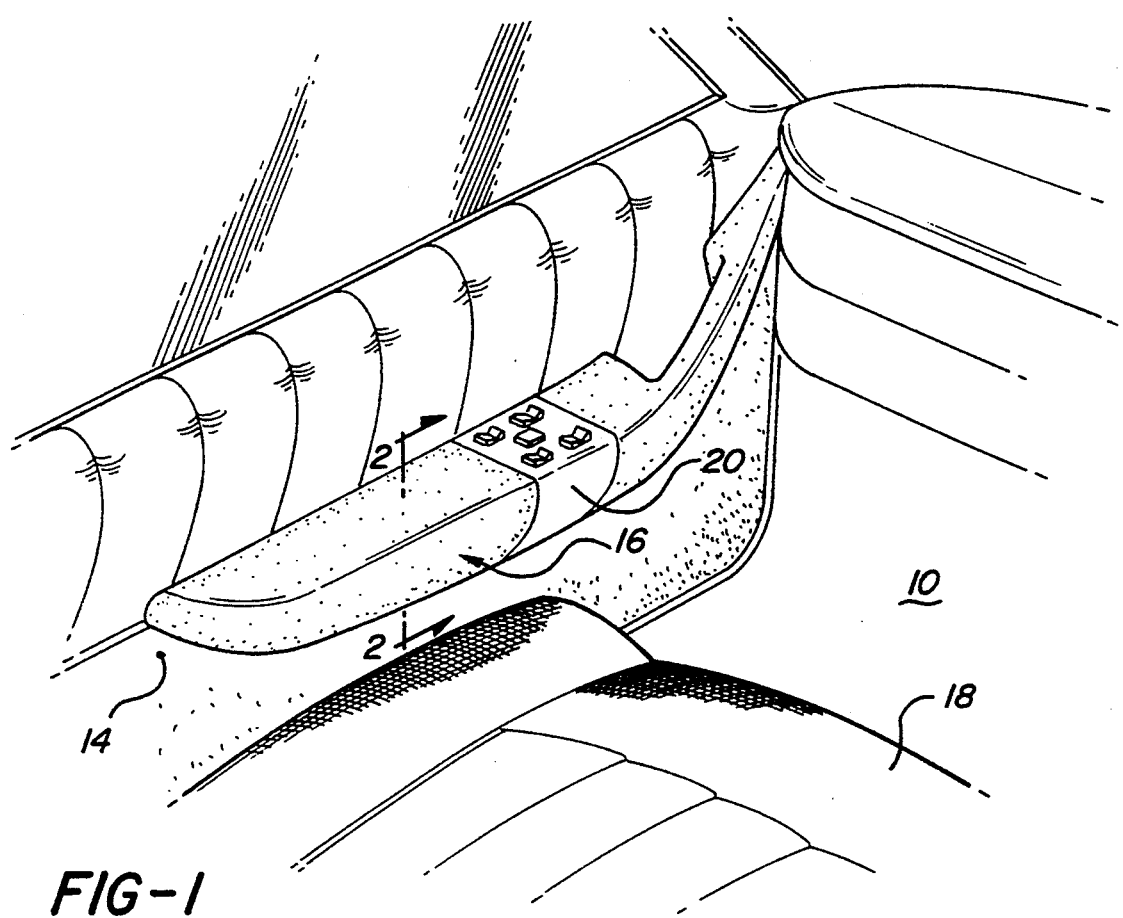
FIG. 1 is a partial perspective view of an automobile passenger compartment having a door equipped with a collapsible arm rest in accordance with the invention.

Referring now to the drawing, FIG. 1 is a partial perspective view of an automobile passenger compartment 10 having a door 14 that is equipped with a collapsible arm rest 16 in accordance with the invention. The collapsible arm rest 16 is attached to the door 14 adjacent the forward end of the passenger seat 18 behind a switch assembly 20.

The collapsible arm rest 16 comprises a flexible skin or covering 22 that is usually cast of polyvinyl chloride or other flexible plastic material and an inner layer of elastomeric foam material 23 such as semi-rigid polyurethane foam that underlies the flexible skin 22 to provide a cushion and soft feel for the collapsible arm rest 16.

Figure 2:
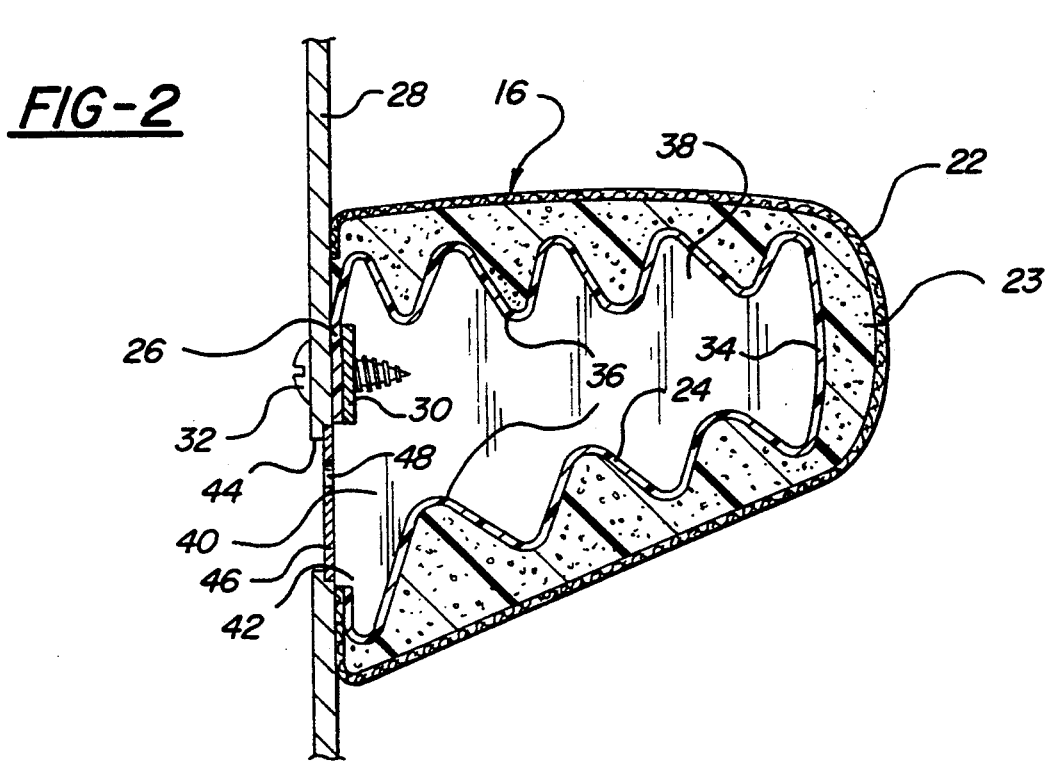
FIG. 2 is a sectional view of the collapsible arm rest taken substantially along the line 2—2 of FIG. 1 looking in the direction of the arrows.
Figure 3:
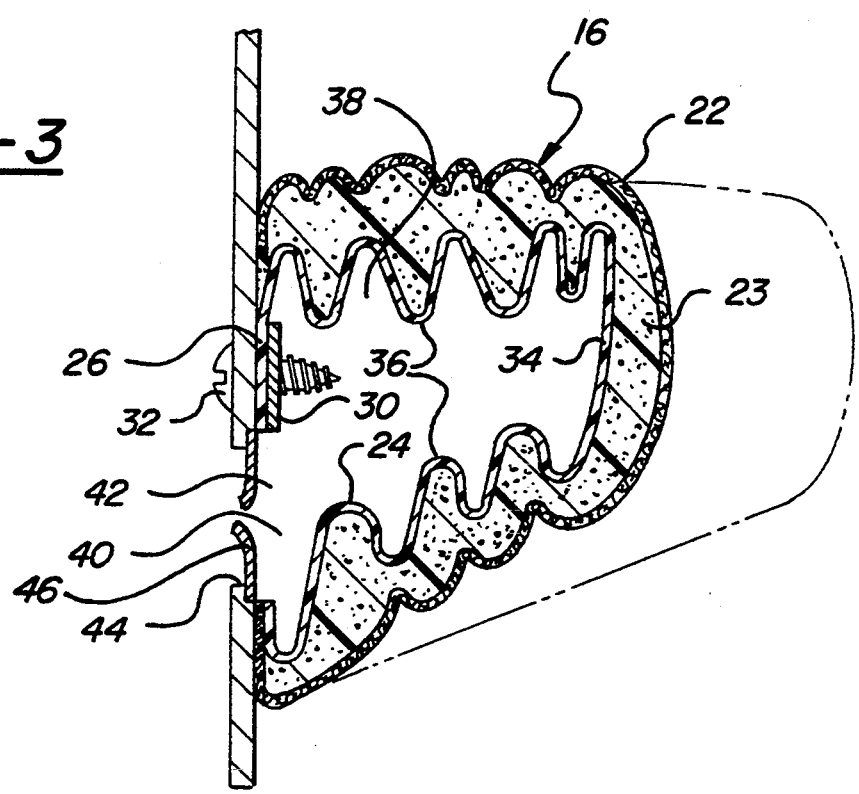
FIG. 3 is a sectional view of the collapsible arm rest in a collapsed state.
Figure 4:
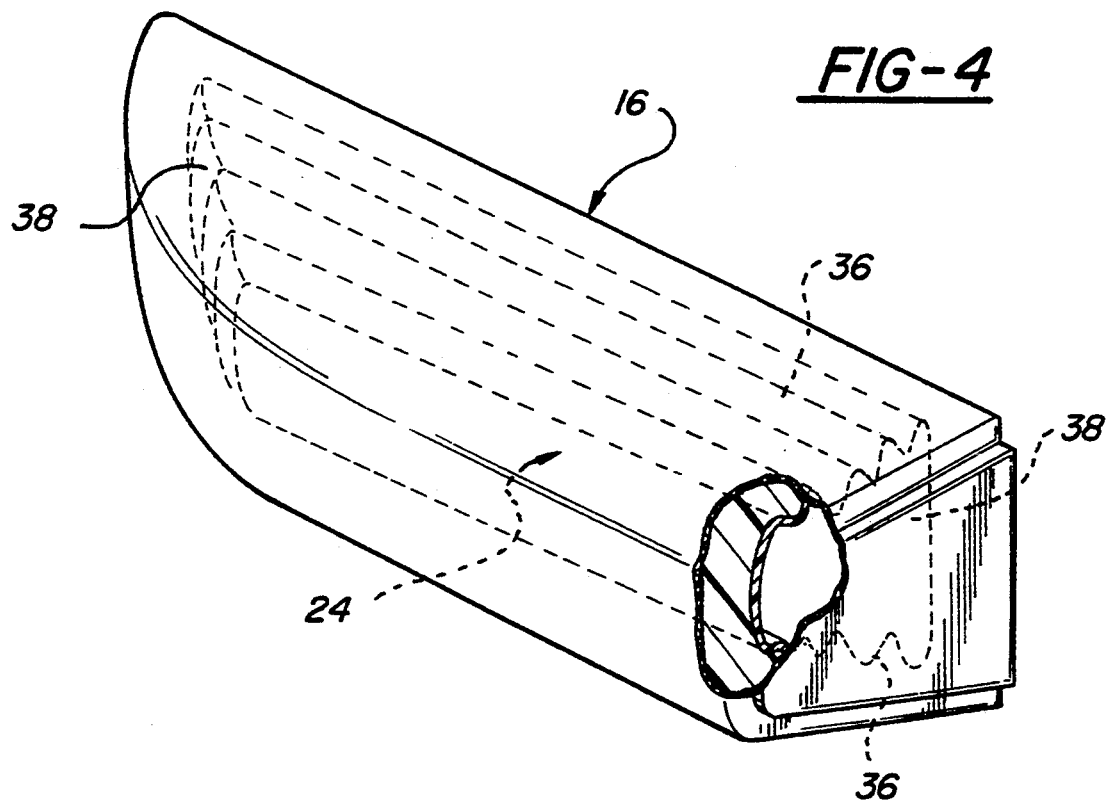
FIG. 4 is a partially sectioned perspective view of the collapsible arm rest shown in FIGS. 1 and 2.

The collapsible arm rest 16 further includes a plastic substrate or insert 24 that can be made of materials such as thermoplastic olefins (TPO), thermoplastic elastomers (TPE), thermoplastic rubbers (TPR) copolyesters (COPE), nylons and polypropylene (PP). The insert 24 has an open attachment end 26 that is suitably adapted for securing the collapsible arm rest 16 to the to the generally vertical trim panel 30 of the vehicle door 14 by suitable means such as a steel back plate 30 and sheet metal screws 32 as illustrated in FIGS. 2 and 3.

The insert 24 which is embedded in the foam layer 23 for strengthening the arm rest 16 comprises a hollow, bellows shaped, thin walled shell that has a slightly arcuate end wall 34 that is laterally spaced from the attachment end 26 by a peripheral wall comprising four rectangularly related side walls that extend in the lateral direction. These include two thin, vertically spaced side walls 36 and two longitudinally spaced side walls 38. The vertically spaced side walls 36 have a plurality of corrugations so that the shell collapses in the lateral direction when the arm rest is subjected to a side load of the type experienced in a side impact automobile collision.

The two longitudinally spaced side walls 38 provide stiffness in the vertical direction so that the arm rest does not collapse or sag vertical under normal arm loads. The side walls 38 may also have a plurality of corrugations matching those of the side walls 36 or may be generally planar as shown since the planar side walls 38 do not inhibit lateral collapsibility of the arm rest 16 to any appreciable extent due primarily to their short height. Moreover, the rear side wall 38 which is at the more vulnerable side impact location is slanted so that it has even less of an inhibiting effect on lateral collapsibility of the arm rest 16.

The hollow, bellows shaped, thin walled shell that comprises end wall 32 and side walls 36 and 38 is shaped so as to define an enclosed chamber 40 that is kept empty during the manufacturing process. In other words, the arm rest 16 is made so that the foam cushion 23 fills the space between the insert 24 and the skin 22 but not the space inside the insert 24. This has several advantages. The foaming process is easier. Less foaming material is required. The resulting arm rest 16 is lighter. And the lateral collapsibility of the arm rest 16 is controlled more easily.

As indicated earlier the attachment end 26 of the insert 24 is open. This provides a large opening or vent 42 for establishing fluid communication between the empty chamber 40 and ambient air outside the arm rest 16 via a corresponding panel opening 44 when the arm rest 16 is installed on the trim panel 28 as shown in FIG. 3. This large vent is closed by a rupturable membrane 46 which serves two important functions. Firstly, the membrane 46 guards or protects the vent 42 against the intrusion of debris into the empty chamber 40 during normal vehicle operation as shown in FIG. 2. Secondly and perhaps more importantly, the membrane is rupturable so that it ruptures easily when the vehicle experiences a side impact and the insert 24 collapses in the lateral direction to avoid pneumatic delay in the lateral collapse of the insert 24 as shown in FIG. 3. In this regard it should be noted that the rupturable membrane 46 is located well out of harm's way at the attached end of the arm rest 16 where it is not exposed to accidental puncture. The rupturable membrane can be attached to the insert attachment end 26 at the attachment end of the arm rest 16 or to the face of the panel 28 as shown in FIG. 2.

The chamber 40 is also vented to accommodate normal changes in ambient conditions so that so that the bellows shaped insert 24 does expand or contract in response to ordinary temperature and pressure changes. Thus the arm rest 16 also includes a small open vent 48 that may be conveniently provided in the rupturable membrane 46 as shown in FIG. 2.

The arm rest is easily and economically manufactured by blow molding the plastic insert 24, placing it inside a cast skin 22 and foaming the intermediate semi-rigid foam layer 23 in place.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A collapsible arm rest for a passenger compartment of a motor vehicle comprising:
    a flexible skin or covering, a layer of elastomeric foam material underlying the flexible skin to provide a cushion and soft feel for the collapsible arm rest, and an insert embedded in the foam layer for strengthening the arm rest, the insert comprising a hollow bellows shaped thin walled shell that has an open attachment end for securing the collapsible arm rest to a generally vertical panel of a motor vehicle, the shell having an end wall that is laterally spaced from the attachment end and a thin peripheral wall that extends in the lateral direction and that has a plurality of corrugations so that the shell collapses in the lateral direction when the arm rest is subjected to a side load of the type experienced in a side impact automobile collision, and the shell defining an empty chamber that communicates with ambient air via a small open vent and a large vent that is covered by a rupturable membrane that ruptures when the shell collapses in the lateral direction readily to avoid pneumatic delay in the lateral collapse of the shell.

2. The collapsible arm rest as defined in claim 1 wherein the peripheral wall has four rectangularly related side walls that include two vertically spaced side walls that have a plurality of corrugations.

3. The collapsible arm rest as defined in claim 2 wherein the peripheral wall includes two longitudinally spaced side walls that are generally planar.

4. A collapsible armrest for a passenger compartment of a motor vehicle comprising:

a flexible skin or covering, a layer of semi-rigid foam material underlying the flexible skin to provide a cushion and soft feel for the collapsible arm rest, an insert embedded in the foam layer for supporting the arm rest under normal arm loads, the insert comprising a hollow bellows shaped thin walled shell that has a thin peripheral side wall that has a plurality of corrugations so that the shell collapses in the lateral direction when the arm rest is subjected to a side load of the type experienced in a side impact automobile collision, the shell at least partly defining an empty chamber that communicates with ambient air via a vent that opens when the shell collapses in the lateral direction to avoid pneumatic delay in the lateral collapse of the shell.

5. The collapsible arm rest as defined in claim 4 wherein the vent is closed by a rupturable membrane.

6. The collapsible arm rest as defined in claim 5 wherein the rupturable membrane includes a small open vent for accommodating ambient temperature change.

7. The collapsible arm rest as defined in claim 6 wherein the peripheral wall has four rectangularly related side walls that include two vertically spaced side walls that have a plurality of corrugations.

8. The collapsible arm rest as defined in claim 7 wherein the peripheral wall includes two longitudinally spaced side walls that are generally planar.

9. A collapsible arm rest for a passenger compartment of a motor vehicle comprising:

a flexible skin or covering, a layer of semi-rigid foam material underlying the flexible skin to provide a cushion and soft feel for the collapsible arm rest, an insert embedded in the foam layer for supporting the arm rest under normal arm loads, the insert comprising a hollow shell that is shaped so that the shell collapses in the lateral direction when the arm rest is subjected to a side load of the type experienced in a side impact automobile collision, the shell at least partly defining an empty chamber that communicates with ambient air via a vent when the shell collapses in the lateral direction to avoid pneumatic delay in the lateral collapse of the shell.

10. The collapsible arm rest as defined in claim 9 wherein the vent is covered by a rupturable membrane which guards against intrusion of debris into the empty chamber and which ruptures easily when the insert collapses in the lateral direction so as to avoid pneumatic delay in the lateral collapse of the shell.

11. The collapsible arm rest as defined in claim 10 wherein the rupturable membrane includes a small open vent for accommodating ambient temperature change.

* * * * *